US007330789B2

(12) United States Patent
Jeon et al.

(10) Patent No.: US 7,330,789 B2
(45) Date of Patent: Feb. 12, 2008

(54) APPARATUS AND METHOD FOR PROVIDING A TELEMATICS SERVICE HAVING AND AGPS FUNCTION

(75) Inventors: Ji-Youn Jeon, Seoul (KR); Jin-Won Kim, Seoul (KR); Chan-Woo Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 361 days.

(21) Appl. No.: 10/917,122

(22) Filed: Aug. 12, 2004

(65) Prior Publication Data

US 2005/0065725 A1 Mar. 24, 2005

(30) Foreign Application Priority Data

Sep. 20, 2003 (KR) .................. 10-2003-0065400

(51) Int. Cl.
*G08G 1/0962* (2006.01)
*H04Q 7/20* (2006.01)
*G01S 1/00* (2006.01)

(52) U.S. Cl. .................. 701/213; 701/214; 701/215; 455/456.2; 455/456.3; 342/357.09; 342/358

(58) Field of Classification Search .................. 701/213, 701/214, 215, 216; 455/424.2, 456.1, 456.3; 340/991, 993; 342/357.1, 357.03, 357.05, 342/357.06, 357.02, 358
See application file for complete search history.

(56) References Cited

U.S. PATENT DOCUMENTS 6,760,582 B2 * 7/2004 Gaal ........................ 455/423

| 6,919,841 | B2* | 7/2005 | Yamazaki ............ 342/357.06 |
| 6,950,664 | B2* | 9/2005 | Chen et al. ............ 455/456.5 |
| 6,999,778 | B2* | 2/2006 | DiBuduo ................ 455/456.1 |
| 2002/0164998 | A1* | 11/2002 | Younis .................... 455/456 |
| 2002/0190896 | A1* | 12/2002 | Tsujimoto et al. ........ 342/357.1 |
| 2003/0043069 | A1 | 3/2003 | Shamoto et al. |
| 2003/0134646 | A1* | 7/2003 | Forrester .................. 455/456 |
| 2004/0198378 | A1* | 10/2004 | Hay ...................... 455/456.1 |
| 2004/0203880 | A1* | 10/2004 | Riley .................... 455/456.1 |
| 2005/0003833 | A1* | 1/2005 | Younis .................. 455/456.1 |
| 2005/0046613 | A1* | 3/2005 | Ruutu et al. ............ 342/357.1 |

FOREIGN PATENT DOCUMENTS

| WO | WO 02/30005 | 4/2002 |
| WO | WO 03/045084 | 5/2003 |

\* cited by examiner

*Primary Examiner*—Tan Q. Nguyen
(74) *Attorney, Agent, or Firm*—The Farrell Law Firm, PC

(57) ABSTRACT

An apparatus for providing a telematics service including an AGPS function. An initial position measuring time of a telematics system is shortened due to the AGPS function of the telematics service, so the telematics service is rapidly provided to a user. Because the telematics system utilizes satellite ephemeris information and user position information, a reception sensitivity of a GPS signal is improved in a downtown area, in which the GPS signal is attenuated. The telematics system includes an AGPS information processing module for rapidly providing the telematics service to the user.

17 Claims, 4 Drawing Sheets

APPARATUS AND METHOD FOR PROVIDING A TELEMATICS SERVICE HAVING AND AGPS FUNCTION

PRIORITY

This application claims priority to an application entitled "Apparatus for Providing Telematics Service Having AGPS Function" filed in the Korean Intellectual Property Office on Sep. 20, 2003 and assigned Ser. No. 2003-65400, the contents of which are hereby incorporated by reference.

BACKGROUND OF THE INVENTION

1. Field of the Invention

The present invention relates generally to an apparatus for providing a telematics service, and more particularly to a telematics system including an AGPS (Advanced Global Positioning System) function and a mobile communication terminal.

2. Description of the Related Art

Telematics is a compound of "telecommunication" and "informatics". Telematics is a technique for providing a mobile communication service and a position tracking service to a vehicle so as to provide information about a vehicle accident, a vehicle burglary, a driving route, traffic and life information, and games in real time. Telematics systems provide services in relation to a present position of a user, so telematics systems are based on a GPS (global positioning system) capable of detecting the present position of the user.

GPS has been designed for military use by the ministry of defense. However, some GPS functions have been permitted to be used by private businesses. The GPS satellite signals, which are permitted to be used by private businesses, are created by modulating signals, which are obtained by multiplying navigation data by a pseudo random noise code of each satellite, into a carrier. Navigation data is transmitted from the GPS satellite with a transmission speed of 50 bps and enables the user to recognize a position of the GPS satellite. The navigation data includes information about a normal operating state of the satellite, parameters for calculating a satellite clock error, ephemeris information of the satellite, and compensating values for determining a time delay of signals caused by an ionospheric layer.

A GPS receiver receives GPS satellite signals in order to demodulate the carrier and the pseudo random code, and to decode navigation data contained in the GPS satellite signals.

A mobile communication terminal equipped with the GPS receiver determines its position by measuring a distance between a satellite and the mobile communication terminal, after precisely calculating a position of the corresponding satellite based on the navigation data. The distance between the satellite and the mobile communication terminal, which is called a "pseudo-range", may be obtained by calculating a wave arrive time from the satellite to the mobile communication terminal, after measuring a phase of the pseudo random network code of each satellite included in the GPS signals.

In addition, different from a receipt manner for a general CDMA signal, signal searching and tracking processes must be simultaneously performed in carrier and code areas when receiving the GPS signal because the GPS signal is subject to a Doppler shift (few kHz) due to rapid movement of the satellite. Consequently, it takes a long time to measure an initial position by using the telematics system measuring the position based on the GPS signal. In addition, an alignment of the satellites is designed such that at least six GPS satellites may be observed from anywhere on the earth. However, a multi-path or an attenuation of the signal may occur due to obstacles, such as buildings or street trees. As a result, it is commonly for only three satellites or less are observed.

FIG. 1 is a block view illustrating a conventional telematics system. Referring to FIG. 1, the conventional telematics system comprises a telematics terminal 10 including a GPS receiver 11, a processing section 13, and a communication section 15, a telematics server 20, and a mobile communication system 30.

FIG. 2 is a schematic view illustrating a service procedure by using present position information of the conventional telematics system. Hereinafter, the service procedure using present position information of the conventional telematics system will be described with reference to FIGS. 1 and 2.

Initially, the telematics terminal 10 receives the GPS signal and measures a present position. The telematics terminal 10 then transmits the measuring result to the telematics server 20 in order to request a service in relation to present position information in step S11. Accordingly, the GPS receiver 11 receives the GPS signal from the GPS satellite and transmits the GPS signal into the processing section 13. The processing section 13 measures the present position of the telematics terminal 10 and transmits present position information to the communication section 15. The communication section 15 transmits present position information in the form of a message to the telematics server 20. In addition, in a route guide service, the communication section 15 transmits destination information requested by the user to the telematics server 20 by adding destination information to the present position information in the form of a message.

Therefore, the telematics server 20 creates various types of service information in relation to the present position of the telematics terminal 10 by using present position information transmitted from the telematics terminal 10 in step S13 and provides services in relation to the present position of the telematics terminal 10 to the telematics terminal 10 in step S15.

As described above, the conventional telematics system must sequentially search a search area, which consists of frequencies and codes with respect to each satellite, in order to enable the telematics terminal 10 to obtain the GPS signal, if information is not provided. In addition, the conventional telematics system does not use satellite ephemeris information and user position/time information.

Therefore, the conventional telematics system takes a long time to measure an initial position of the telematics terminal, and a start time for the service may be delayed.

SUMMARY OF THE INVENTION

Accordingly, the present invention has been designed to solve the above-mentioned problems occurring in the prior art, and a first object of the present invention is to provide a telematics system and a method for rapidly providing a telematics service by shortening an initial position measuring time of the telematics system.

A second object of the present invention is to provide a telematics system and a method for improving a receive sensitivity of a GPS signal in a downtown area in which the GPS signal is attenuated, by utilizing satellite ephemeris information and user position information.

To accomplish the above and other objects, there is provided a telematics system comprising: a position determination entity server for storing and managing AGPS information including ephemeris information and compensation information of a satellite; a telematics terminal for receiving AGPS information from the position determination entity server to measure a present position of a moving object by using the AGPS information and requesting a telematics service by using the present position information; and a telematics server for receiving AGPS information from the position determination entity server in response to the telematics service request of the telematics, transmitting the AGPS information to the telematics terminal, and providing the telematics terminal with the telematics service requested by the telematics terminal by using the present position information of the telematics terminal.

Additionally, there is provided a method for providing a telematics service. The method includes the steps of receiving AGPS information including ephemeris information and compensation information of a satellite by using a telematics terminal in order to measure a present position of a moving object; measuring the present position of the moving object by using the AGPS information and time information of the telematics terminal; and receiving a position-related service based on the present position of the moving object.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
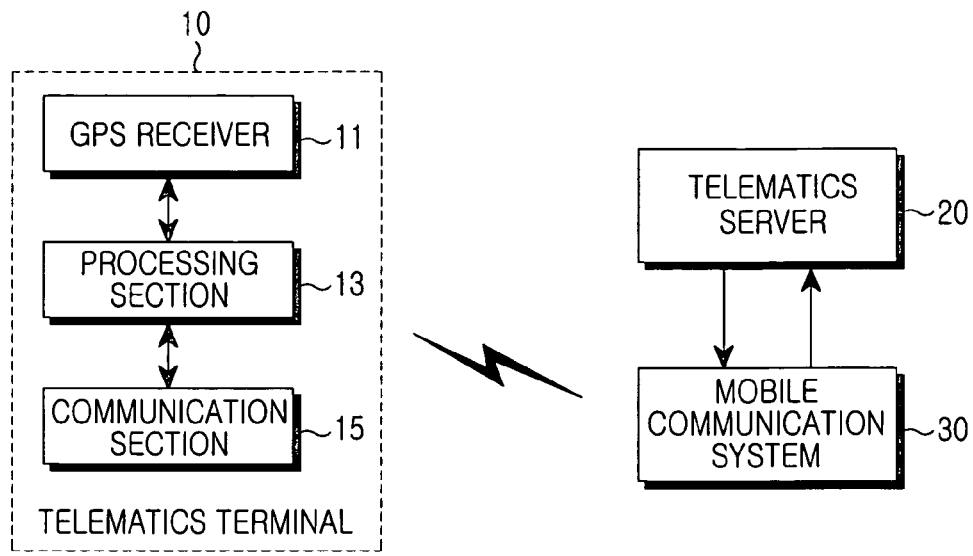
FIG. 1 is a block view illustrating a structure of a conventional telematics system.
Figure 2:
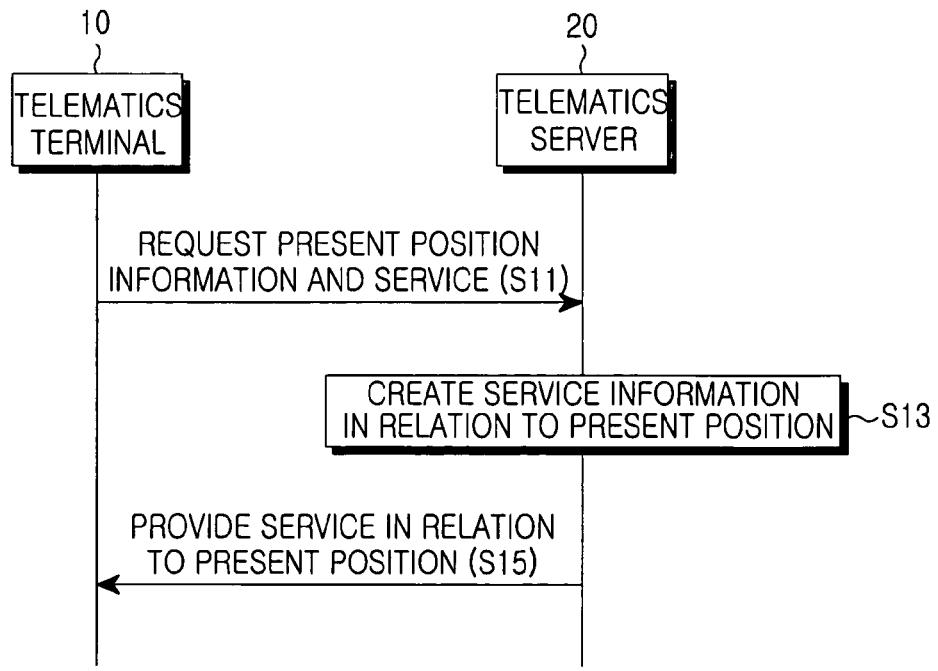
FIG. 2 is a schematic view illustrating a service procedure using present position information of a conventional telematics system.

Hereinafter, preferred embodiments of the present invention will be described in detail with reference to the accompanying drawings. In the following description of the present invention, the same reference numerals are used to designate the same or similar components and a detailed description of known functions and configurations incorporated herein will be omitted when it may make the subject matter of the present invention rather unclear.

Figure 3:
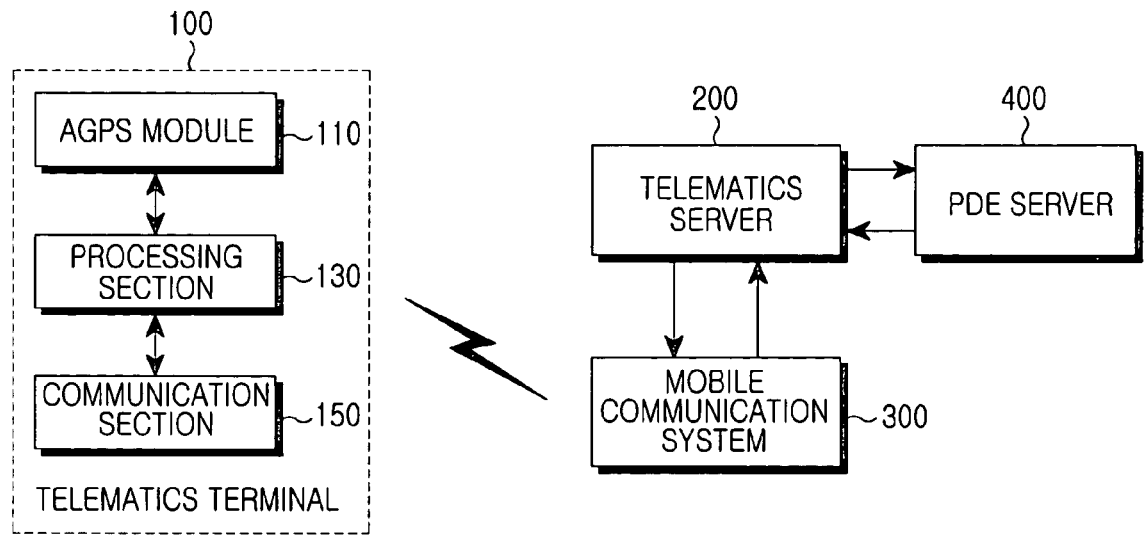
FIG. 3 is a block view illustrating a structure of a telematics system according to an embodiment of the present invention.

FIG. 3 is a block view illustrating a structure of a telematics system according to an embodiment of the present invention. Referring to FIG. 3, the telematics system of the present invention comprises a telematics terminal 100 including an AGPS (assisted global positioning system) module 110, a processing section 130, and a communication section 150, a telematics server 200, a mobile communication system 300, and a PDE (position determination entity) server 400.

The AGPS module 110 receives the GPS signal in order to measure a position of the telematics terminal 100 by using predetermined satellite ephemeris information and error information. The AGPS module 110 helps reduce a long warm-up time derived from a receipt of navigation data, so that the position of the telematics terminal 100 can be detected in a shorter time. That is, the conventional GPS receiver must sequentially search a search area consisting of frequencies and codes with respect to each satellite, in order to obtain the GPS signal. However, when the AGPS module 110 is used, the GPS receiver (not shown, but included in the AGPS module 110) may substantially know position/time information of the user based on pre-measured satellite ephemeris information and error information. As a result, it is possible to predict a number and a Doppler shift value of the satellite observed from a position of the user. Accordingly, a number of satellites to be searched by the GPS receiver can be reduced and a time required for measuring the position of the terminal can be shortened.

The structure and operation of the mobile communication system 300 is widely known to one skilled in the art, so a detailed structure of the mobile communication system 300 is omitted in FIG. 3. In addition, the structure of the mobile communication system 300 will not be further described herein below.

The AGPS module 110 of the telematics terminal 100 illustrated in FIG. 3 enables the telematics terminal 100 to perform AGPS functions. More specifically, the PDE server 400 stores and manages satellite ephemeris information and correction information, i.e., AGPS information. When the telematics terminal 100 requests the AGPS information, the PED server 400 receives the AGPS information from the telematics server 200 and transmits the AGPS information to the telematics terminal through the telematics server 200. At this time, as illustrated in FIG. 3, the telematics terminal 100 communicates, i.e., transfers data, with the telematics server 200 through the mobile communication system 300. This kind of data communication may be applied to the entire following procedure.

In operation, the telematics terminal 100 is mounted on a moving object, such as a vehicle, so as to measure the present position of the moving object. In addition, the telematics terminal 100 transmits present position information to the telematics server 200 in order to receive services utilizing the present position information in response to a request of the user. If the user has requested a route guide service, the telematics terminal 100 transmits destination information to the telematics server 200 together with present position information. Particularly, the telematics terminal 100 requests AGPS information from the PDE server 400 through the telematics server 200, and receives AGPS information in response to the request. Then, the telematics terminal 100 measures the present position based on AGPS information.

As described above, the telematics terminal 100 includes the AGPS module 110, the processing section 130, and the communication section 150. The processing section 130 manages the operation of the telematics terminal 100 based on an external operating signal. In particular, the processing section 130 transmits a control signal requesting AGPS information to the AGPS module 110 when the external operating signal requesting the present position is transmitted thereto. In addition, the processing section 130 receives data required for calculating the present position from the AGPS module 110, such as pre-measured satellite ephemeris information and error information, so as to transmit data request information to the telematics server 200 through the communication section 150.

The processing section 130 transmits the AGPS information, which has been transmitted from the telematics server 200 through the communication section 150, to the AGPS module 110. Thereafter, the AGPS module 110 measures the present position by using the AGPS information.

Additionally, the processing section 130 receives resultant data for the present position from the AGPS module 110 and transmits the resultant data to the communication section 150. Accordingly, the communication section 150 requests the service utilizing the present position information by transmitting present position information to the telematics server 200.

If, for example, the route guide service has been requested, the communication section 150 transmits destination information, which is determined by the external operating signal, to the telematics server 200 together with present position information. At this time, the communication section 150 not only makes data communication between the telematics terminal 100 and the telematics server 200 through the mobile communication system 300, but also performs a conventional mobile communication function. Therefore, the communication section 150 must include a communication module capable of performing mobile communication, such as CDMA (code division multiple access) and UMTS (universal mobile telecommunication).

The telematics server 200 manages the all telematic services. More particularly, the telematics server 200 provides a service utilizing present position information to the telematics terminal 100, when the telematics terminal 100 requests the service. In addition, when the telematics terminal 100 requests AGPS information, the telematics server 200 requests the AGPS information from the PDE server 400 in order to provide the AGPS information to the telematics terminal 100.

Although the telematics terminal 100 described above includes the communication section 150, it is also possible to use the telematics terminal without the communication module. In this case, the telematics terminal 100 is connected to a conventional mobile communication terminal with an interface, such as a UART (universal asynchronous receiver/transmitter). When the mobile communication terminal is connected to the telematics terminal, the mobile communication terminal can receive the AGPS signal even if the mobile communication terminal has no GPS function.

Figure 4:
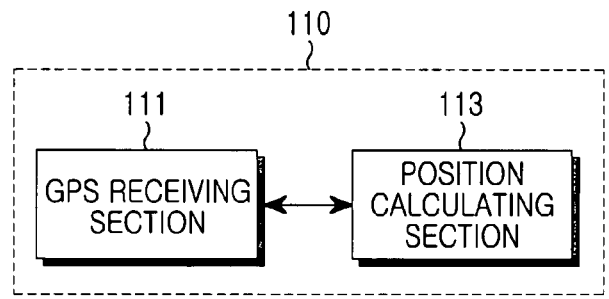
FIG. 4 is a schematic block view illustrating an AGPS module according to an embodiment of the present invention.

FIG. 4 is a schematic block view illustrating the AGPS module 110 according to an embodiment of the present invention. Referring to FIG. 4, the AGPS module 110 of the present invention includes a GPS receiving section 111 and a position calculating section 113. The GPS receiving section 111 analyzes the GPS signal transmitted from the GPS satellite and transmits data thereof to the position calculating section 113. More specifically, the GPS receiving section 111 reduces a search range for receiving the GPS signal by utilizing AGPS information transmitted from the PDE server 400, and as a result, it is possible to obtain the satellite signal within a shorter period of time.

The position calculating section 113 measures the present position of the telematics terminal 100 using the GPS signal transmitted from the GPS receiving section 111. The position calculating section 113 utilizes satellite position information among the AGPS information transmitted from the PDE server 400, and rapidly measures the present position of the telematics terminal 100.

Figure 5:
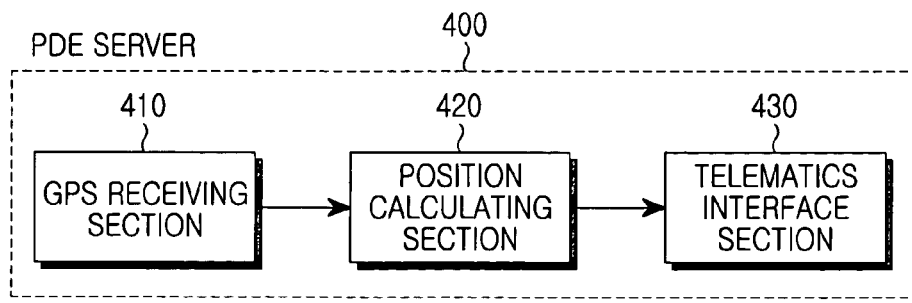
FIG. 5 is a schematic block view illustrating a PDE server according to an embodiment of the present invention.

FIG. 5 is a schematic block view illustrating the PDE server 400 according to an embodiment of the present invention. Referring to FIG. 5, the PDE server 400 includes a GPS receiving section 410, a position calculating section 420, and a telematics interface section (I/F) 430. The GPS receiving section 410 receives GPS information required to calculate the position of the telematics terminal 100 from the GPS satellite and transmits GPS information to the position calculating section 420. The position calculating section 420 calculates the position of the telematics terminal 100 using the GPS satellite signal transmitted thereto from the GPS receiving section 410 and related information thereof. That is, the position calculating section 420 calculates the position of the PDE server 400 using the GPS signal transmitted from the GPS receiving section 410 and measures satellite ephemeris information observed from the PDE server 400 and error information thereof, in order to calculate the position of the telematics terminal 100.

As described above, the PDE server 400 provides the telematics terminal 100 located in a management area of the PDE server 400 with satellite ephemeris information and position information of the telematics terminal 100 so that the telematics terminal 100 can rapidly measure its own present position.

Figure 6:
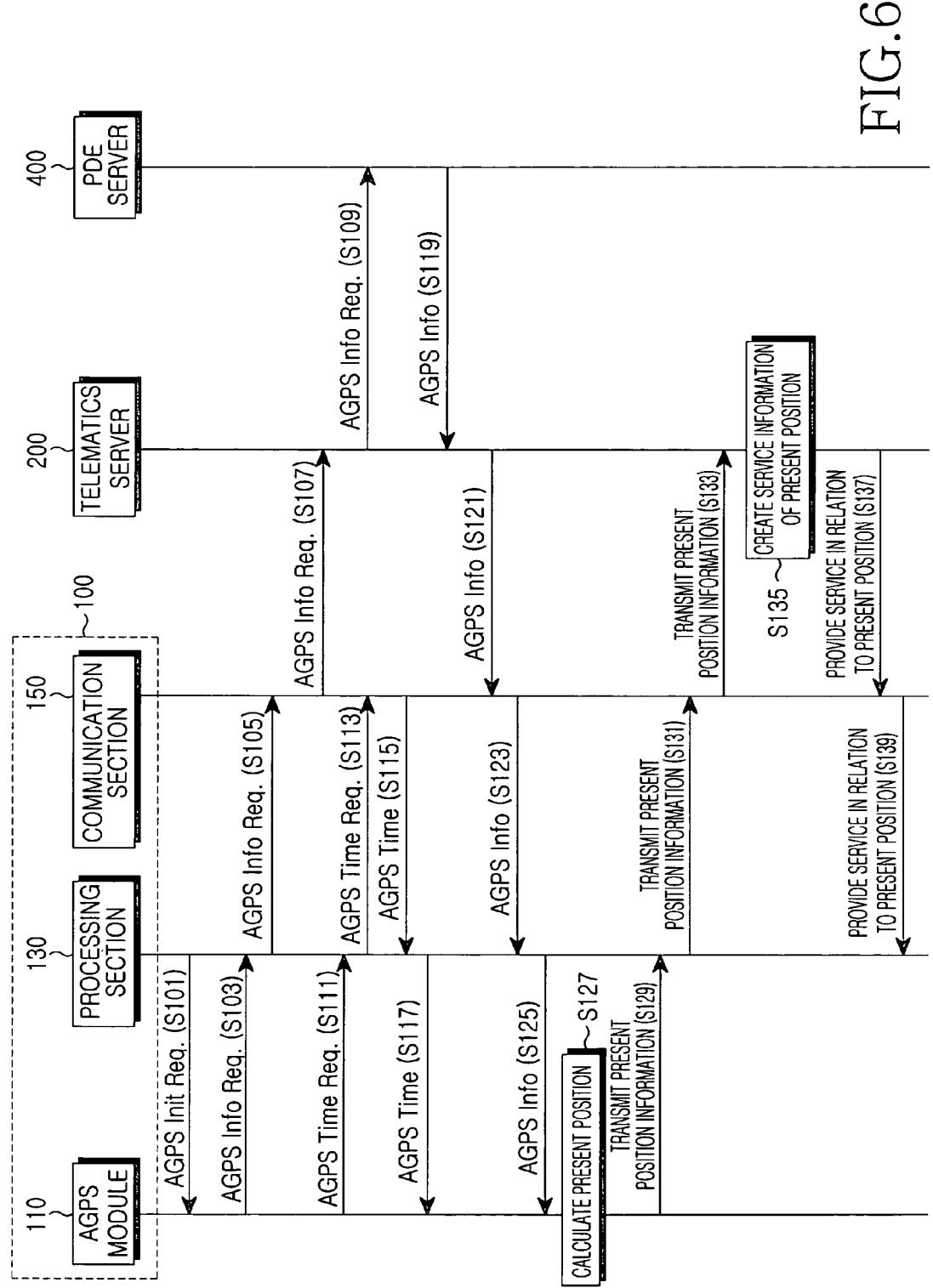
FIG. 6 is a view illustrating a service procedure using present position information of a telematics system according to an embodiment of the present invention.

FIG. 6 is a view illustrating a service procedure using present position information of the telematics system according to an embodiment of the present invention. Referring to FIG. 6, if a user requests present position information using the telematics terminal 100, the processing section 130 requests an initialization of the AGPS module 110 in step S101. Then, when the telematics server 200 connects to the telematics terminal 100 through the mobile communication system, the AGPS module 110, which has been initialized, requests AGPS information required for calculating the present position from the PDE server 400 in steps S103, S105, S107, and S109. More specifically, an AGPS information requesting message of the AGPS module 110 is transmitted to the telematics server 200 through the processing section 130 and the communication section 150 of the navigation terminal 100 in steps S103, S105, and S107, and the telematics server 200 transmits the AGPS information requesting message to the PDE server 400 (S109).

AGPS information created from the PDE server 400 in response to the AGPS information request message is transmitted to the AGPS module 110 from the PDE server 400, the telematics server 200, the communication section 150, and the processing section 130 in steps S119, S121, S123, and S125. Although the mobile communication system is not illustrated in FIG. 6, the telematics server 200 communicates with the communication section 150 of the telematics terminal 100 through the mobile communication system.

The AGPS information, which is requested by the AGPS module 110 and transmitted from the PDE server 400, includes GPS sensitivity assistance, GPS ephemeris, location response, and GPS satellite health information.

Upon receiving the AGPS information, the AGPS module 110 calculates the present position of the telematics terminal 100 in step S127. However, in order to calculate the present position of the telematics terminal 100, time information of the telematics terminal 100 is required. Accordingly, the AGPS module 110 requests the time information from the communication section 150 performing a mobile communication function through the processing section 130 in steps S111 and S113. In response to the request, the communication section 150 transmits AGPS time information to the AGPS module 110 through the processing section 130 in steps S115 and S117.

The AGPS module 110, after receiving the AGPS information and the AGPS time information through above steps S103 to S125, calculates the present position of the telematics terminal 100 by using AGPS information and AGPS time information in step S127. The method for calculating the present position of the telematics terminal 100 using AGPS information and AGPS time information is already-known in the art (for example, Global Positioning System: Theory and Application Volume 1, edited by Bradford W. Parkinson, James J. Spilkere Jr., Published by the American Institute of Aeronautics and Astronautics, Inc.).

After calculating the present position of the telematics terminal 100, the AGPS module 110 transmits the present position information of the telematics terminal 100 to the telematics server 200 through the processing section 130 and the communication section 150 in steps S129, S131, and S133. The telematics server 200, which receives present position information from the telematics terminal 100, provides various services using the present position information, such as an emergency service (for example, E-911), a navigation service, and a traffic information service. Steps S129, S131, and S133, for transmitting present position information from the telematics terminal 100 to the telematics server 200, can be omitted depending on the type of service. For example, if the telematics terminal 100 itself calculates the route for the navigation, steps S129, S131 and S133 may be omitted.

After receiving present position information from the telematics terminal through steps S129, S131, and S133, the telematics server 200 creates service information in relation to the present position (for example, an optimal route) by using the present position information in step S135, and provides such service information to the telematics terminal 100 in steps S137 and S139. The optical route may be calculated through various methods, which are well-known in telematics and navigation fields, and therefore, not described herein.

Figure 7:
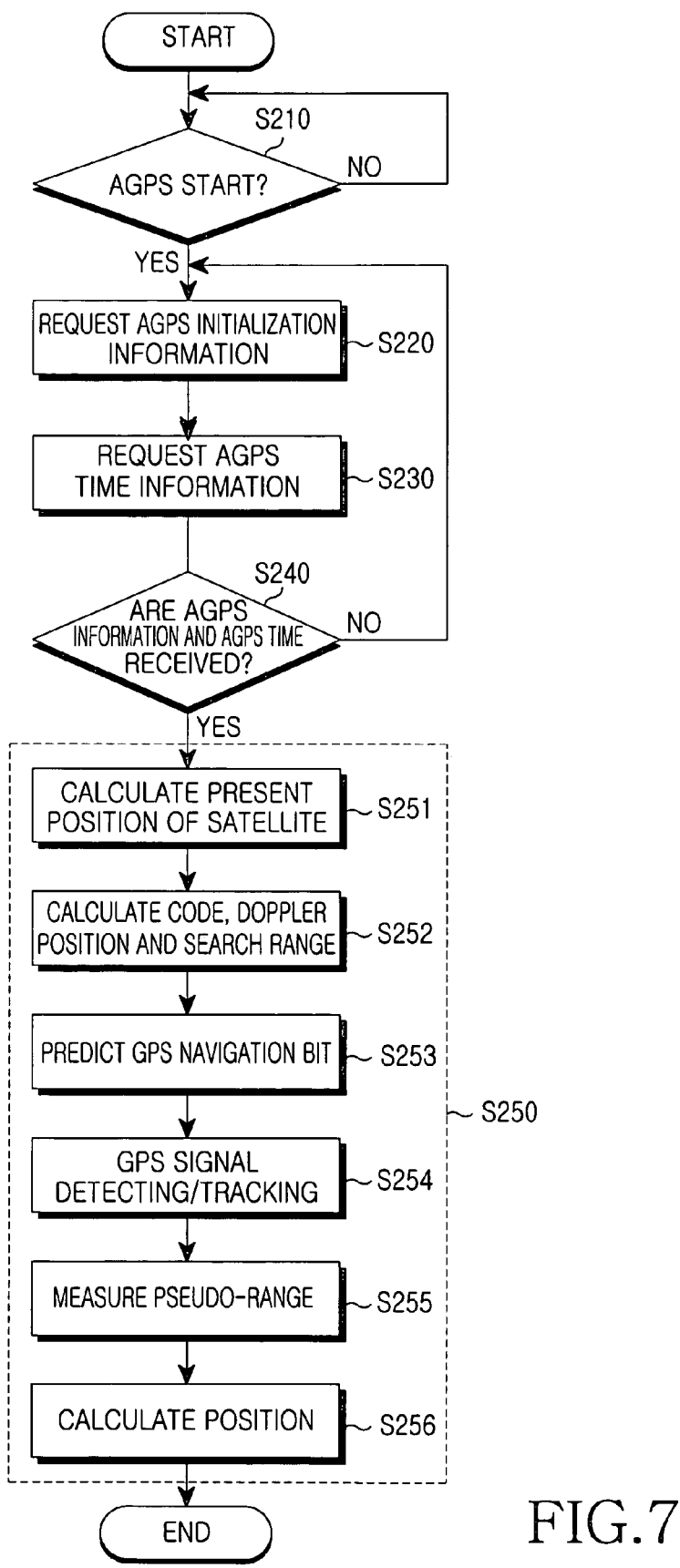
FIG. 7 is a flow chart illustrating a position calculating procedure of a telematics system according to an embodiment of the present invention.

FIG. 7 is a flow chart illustrating a position calculating procedure of a telematics system according to an embodiment of the present invention. That is, a procedure for calculating the present position of the AGPS module 110 (referred to FIG. 6) is illustrated in FIG. 7.

Referring to FIGS. 6 and 7, if an AGPS start command is input into the AGPS module 110 for calculating the present position in step S210, the AGPS module 110 requests information required for operating the AGPS from the PDE server 400 in step S220. As described above, the information includes GPS sensitivity assistance, GPS ephemeris, location response, and GPS satellite health information. In addition, the AGPS module 110 requests time information from the communication section 150 in order to rapidly measure the present position in step S230. The AGPS module 110 then receives the AGPS information and the AGPS time information. At this time, if received AGPS time information has a precision degree of minimum 1 second, a satellite search range can be reduced when receiving the GPS satellite signal. Thus, it is possible to obtain the satellite signal within a short time due to the reduced search range.

In step S240, the AGPS determines whether it has received the AGPS information and the AGPS time information. If the AGPS information and the AGPS time information has been received, the process proceeds to step S250. However, if the AGPS information and the AGPS time information has not been received, the AGPS module 110 re-requests the AGPS in formation and the AGPS time information in step S220 and S230.

The AGPS module 110 receiving AGPS information and AGPS time information obtains the signal from the satellite by using above information. Thus, the telematics terminal 100 calculates the present position by utilizing the obtained signal in step S250. This calculation step S250 corresponds to step S127 of calculating the present position illustrated in FIG. 6. Hereinafter, step 250 will be described in more detail.

The AGPS module 110 calculates a position of the satellite, a moving speed of the satellite, and a relative distance and a relative speed of the satellite with respect to corresponding GPS receiver in step S251. Then, the AGPS module 110 determines a code capable of rapidly obtaining the GPS signal in an early stage, and a search range and a central search point of Doppler in step S252. Next, the AGPS module 110 predicts a GPS navigation bit in order to improve sensitivity of the GPS in step S253, and performs a search by increasing a synchronous integration period using the predicted GPS navigation bit.

In addition, the AGPS module 110 performs a GPS signal tracking/detecting in step S254. As a result, the AGPS module 110 measures a pseudo-range between the satellite and the GPS receiver in step S255 and calculates the position of the GPS receiver (that is, the position of the user) using ephemeris information of the GPS satellite transmitted thereto from the server in step S256.

As described above, according to the present invention, the AGPS is utilized when measuring an initial position required for providing a telematics service. As a result, an initial position measuring time can be reduced, thereby advancing a start point of the telematics service. That is, a standby time of the user, which is required until the present position has been represented in the GPS receiver to obtain the initial position of the user, can be significantly reduced.

In addition, because the present invention uses AGPS information, the reception sensitivity of the GPS signal in a downtown area, in which the GPS signal is attenuated, can be improved and the position of the user can be precisely measured. As a result, it is possible to significantly reduce a route departure phenomenon while a telematics routing service is being provided even if the user is in a GPS shadow area of the downtown where the GPS does not measure the position of the user.

Furthermore, because the present invention utilizes the conventional telematics server and the conventional PDE server, conventional telematics services and AGPS functions can be achieved. Accordingly, the present invention may effectively provide the telematics services to the user.

While the present invention has been illustrated and described with reference to certain preferred embodiments thereof, it will be understood by those skilled in the art that various changes in form and details may be made therein without departing from the spirit and scope of the present invention as defined by the appended claims.

What is claimed is:

1. A telematics system comprising:
   a Position Determination Entity (PDE) server for storing and managing AGPS (Advanced Global Positioning System) information including ephemeris information and compensation information of a satellite;
   a telematics terminal for receiving the AGPS information from the PDE server, determining present position information of a moving object using the AGPS information, and requesting a telematics service using the present position information; and a telematics server for receiving the AGPS information from the PDE server, transmitting the AGPS information to the telematics terminal, and providing the telematics terminal with the telematics service requested by the telematics terminal, using the present position information of the telematics terminal, wherein the PDE server includes a first GPS receiving section for receiving a GPS signal from a GPS satellite, a position calculating section for calculating a position of the PDE server using the GPS signal received in the first GPS receiving section, measuring the ephemeris information and the error information of the satellite, and calculating a position of the telematics terminal utilizing the ephemeris information and the error information of the satellite, and a telematics interface section for interfacing with the telematics server.

2. The telematics system as claimed in claim 1, wherein the position determination entity server is directly connected to the telematics server in order to transmit and receive the AGPS information to and from the telematics server.

3. The telematics system as claimed in claim 1, wherein the telematics terminal comprises:

a processing section for managing an operation of the telematics terminal based on an external operating signal;

a communication section for communicating with the telematics server under a control of the processing section in order to receive the AGPS information; and an AGPS module for determining the present position of the moving object using the AGPS information transmitted thereto from the communication section.

4. The telematics system as claimed in claim 3, wherein the processing section transmits a control signal required for determining the present position to the AGPS module, receives an AGPS information request message required for calculating a position from the AGPS module, and transmits the AGPS information request message to the telematics server through the communication section.

5. The telematics system as claimed in claim 3, wherein the processing section receives the present position information from the AGPS module, transmits present position information to the telematics server through the communication section, and requests a service utilizing the present position information.

6. The telematics system as claimed in claim 3, wherein the processing section receives the AGPS information and a service utilizing the present position information from the telematics server through the communication section in order to transmit the AGPS information to the AGPS module and to provide the service utilizing present position information to a user.

7. The telematics system as claimed in claim 3, wherein the communication section comprises an individual mobile communication terminal connected to a mobile communication network.

8. The telematics system as claimed in claim 3, wherein the communication section comprises a mobile communication module accommodated in the telematics terminal.

9. The telematics system as claimed in claim 3, wherein the AGPS module comprises:

a second GPS receiving section for receiving a GPS signal from a GPS satellite by using the AGPS information; and a position calculating section for determining the present position of the telematics terminal using the GPS signal received in the second GPS receiving section.

10. The telematics system as claimed in claim 3, wherein the communication section obtains time information of the telematics system, synchronizes the time information of the telematics system with time information of the telematics terminal, and transmits the synchronized time information to the AGPS module.

11. The telematics system as claimed in claim 10, wherein the AGPS module calculates the present position of the moving object using the time information and the AGPS information transmitted thereto from the communication section.

12. A method for providing a telematics service, comprising the steps of:

receiving AGPS information including ephemeris information and compensation information of a satellite using a telematics terminal in order to measure a present position of a moving object;

measuring the present position of the moving object using the AGPS information and time information of the telematics terminal; and receiving a position-related service based on the present position of the moving object, wherein receiving the AGPS information includes transmitting a signal requesting the AGPS information to a Position Determination Entity (PDE) server that stores and manages the AGPS information including the ephemeris information and the compensation information of the satellite, and receiving the AGPS information from the position determination entity server, and wherein the PDE server includes a first GPS receiving section for receiving a GPS signal from a GPS satellite, a position calculating section for calculating a position of the PDE server using the GPS signal received in the first GPS receiving section, measuring the ephemeris information and the error information of the satellite, and calculating a position of the telematics terminal utilizing the ephemeris information and the error information of the satellite, and a telematics interface section for interfacing with the telematics server.

13. The method as claimed in claim 12, wherein the time information of the telematics terminal is synchronized with time information of a telematics system by means of a communication section.

14. The method as claimed in claim 12 wherein the time information of the telematics terminal is received in the telematics terminal together with the AGPS information.

15. The method as claimed in claim 12, wherein the position-related service includes an emergency rescue service using information related to the present position of the moving object.

16. The method as claimed in claim 12, wherein the position-related service includes a traffic information service using information related to the present position of the moving object.

17. The method as claimed in claim 12, wherein the position-related service includes a navigation service using information related to the present position of the moving object.

* * * * *